United States Patent

[11] 3,573,743

[72] Inventors Edward P. Hadd; Merlin L. Hanson, St. Paul; Anthony R. Talarczyk, Bloomington, Minn.

[21] Appl. No. 763,643

[22] Filed Sept. 30, 1968

[45] Patented Apr. 6, 1971

[73] Assignee Sperry Rand Corporation New York, N.Y.

[54] PROGRAMMABLE TIMING CONTROLS FOR MAGNETIC MEMORIES
15 Claims, 10 Drawing Figs.

[52] U.S. Cl. .......... 340/172.5

[51] Int. Cl. .......... G05b 19/00

[50] Field of Search .......... 340/172.5; 235/157

[56] References Cited

UNITED STATES PATENTS

| | | | |
|---|---|---|---|
| 3,337,852 | 8/1967 | Lee et al. | 340/172.5 |
| 3,417,378 | 12/1968 | Simonsen et al. | 340/172.5 |
| 3,426,330 | 2/1969 | Marx et al. | 340/172.5 |

OTHER REFERENCES

Wolf, C. H. : Error Detection for Computer Instruction Performance, IBM Technical Disclosure, pp. 39— 40, Vol. 5 No. 7 December 1962

Pitkowsky et al. : Data Processing System Clock Control, IBM Technical Disclosure, pp. 754— 755, Vol. 7 No. 9 February 1965

*Primary Examiner*—Paul J. Henon
*Assistant Examiner*—R. F. Chapuran
*Attorneys*—Thomas J. Nikolai, Kenneth T. Grace and John P. Dority

ABSTRACT: A magnetic memory access control system including programmable read-probe timing control circuitry for programmably changing the time of occurrence of read-probe pulses in response to programmed control instruction is described. The system includes a data processor capable of issuing control instructions for controlling the operation of a magnetic memory device. An access control unit is coupled intermediate to the data processor and the magnetic memory device, and operates to translate the control instructions. One class of control instruction defines the time of occurrence of read-probe pulses, for gating read amplifiers in the magnetic memory device at the programmably selected times.

INVENTORS
EDWARD P. HADD
MERLIN L. HANSON
ANTHONY R. TALARCZYK

BY Charles A. Johnson
ATTORNEY

PROGRAMMABLE TIMING CONTROLS FOR MAGNETIC MEMORIES

BACKGROUND OF THE INVENTION

1. Field of the Invention

This invention relates generally to programmable control circuitry for use with a data-processing system having a magnetic memory device. More particularly, the invention relates to a programmable margin control for magnetic memory devices, whereby the read-probe pulses are programmably controllable with regard to their time of occurrence in a read cycle.

2. Description of the Prior Art

The concept of time-variable read-probe pulses has been known in the prior art. Such prior art systems have had the common problem that in order to alter the selection, it was necessary to interrupt the processing operation and to make a manual selection. In magnetic memory devices, such as magnetic drums, it is common to provide timing signals on the magnetic medium. These timing signals are read by control circuitry and are utilized to time the internal operation of the magnetic memory device. Characteristically, a predetermined time duration is allotted to probing the read amplifiers for causing recorded information to be read out. It is obvious, that such probing necessitates a close control of margins with relationship to the recording of the data. Normally, the read-probe pulse is timed to occur at approximately the midpoint of the time period allocated for a given storage cell. In those instances when some parameter has been altered during recording, it can occur that the data so recorded is not recoverable by the read-probe pulse occuring at the normal time. Shifts in the timing can occur during the recording process such that addressable cells that are to be accessed by a given timed read-probe pulse may be shifted in time and spatial location on the surface of the recording medium such that the normal read-probe pulse cannot accurately read the data for the storage cell. The shifting in time and spatial relationship, can be such that the data cell will occur either earlier or later than normally anticipated. It has been found in the prior art that parity checking of the data read from magnetic storage devices is advantageous in detecting such reading errors. It has also been found in the prior art that when parity errors persistantly occur for given reading operations, that the data presenting the parity error at readout can oftentimes be recovered by changing the time of occurrence of the read-probe pulse. Circuits have been developed, when manually switched, for causing the read-probe pulse to occur a predetermined time earlier than normal; and, likewise, a predetermined time later than normal. As mentioned above, this manual switching of the prior art systems has required that the data-processing operation be brought to a stop, or the very least the magnetic storage device removed from the data processing operation, to perform the manual switching operation. To date, there have been no dynamically alterable margin control devices for magnetic storage devices. Further, since there is no way of knowing initially, whether the margins of the read-probe pulse should be switched for an earlier or a later read-probe time, it was often necessary to make a manual selection of one or the other, restart the system to try to recover the data, and then to be forced to stop the system again when it was determined that the parity error or other error indication persisted.

Having stopped the second time, the alternative selection could be made, and the system again restored for attempting to recover the data. In this manner, it can be seen that substantial amounts of computation time for the data-processing system are lost. Further, it is apparent that such prior art system necessitate the attendance of a skilled operator at the data-processing system location who is capable of recognizing the nature of the fault, stopping the system, making the appropriate manual selection, and reinitiating operation. This operator attendance is expensive and the loss of computational time on complex data-processing system is extremely expensive.

SUMMARY OF THE INVENTION

It has been found that by the addition of a programmable margin control circuit for altering the time of occurrence of the read-probe pulses in response to programmable selections, that many of the problems of the prior art can be virtually eliminated. The addition of the programmable margin control circuitry operates to provide a means of automatic response to detected errors in the reading of data from a magnetic storage device. Generally, it may be considered that data signals are being read correctly by the magnetic storage device in response to the normally timed read-probe pulses. As the data is read, parity checks are made on the data signals. Upon the occurrence of a parity error, a signal is sent to the margin control device, and in turn to the data processor. In the prior art, such a parity error would indicate that the system should be stopped and manual adjustments made. With this invention, however, the data processor can respond automatically without interrupting the processing operation by sending a new control instruction to the margin control device indicating that the read-probe pulses should occur a predetermined time earlier than normal. The same data cells can then be read again, and a parity check made on the data signals so read. If some parameter had been changed during recording, to cause the data cells to be recorded slightly earlier in time than normal, such a shift of the read-probe pulse will very likely recover the data and a correct parity signal will be received. In the event that a parity error occurs again, the error signal is sent to the processor and it can again automatically initiate a new control instruction to the margin control circuit indicating that the read-probe pulse should occur a predetermined time later than the normal read-probe pulse. The data cells can be automatically read yet another time in an attempt to recover the data. If during recording, some occurrence has caused the data cells to be recorded at a time later than normally expected, such a shift of the read-probe pulses will very likely enable the data to be recovered. In the event the data cannot be so recovered by either the advancing or retarding of the timing of the read-probe pulses, it indicates that there is some more serious error condition in the system and the processor can be advised to take some other corrective action, such as switching the magnetic storage device out of the data-processing system and providing an indication that maintenance is warranted. As indicated, the programmable margin control system is so devised that the processor can automatically attempt to recover data that has been indicated as erroneous without having to bring the data-processing system to a halt for the manual switching required in the prior art. Further, there is no necessity of a trained operator to be in attendance since the recovery procedure is preprogrammed in the processor and is brought into play automatically.

It is a primary object, then, of this invention to provide an improved magnetic storage system for use in the data-processing system. Yet another object of this invention is to provide an improved margin control system for permitting programmable alterations of the time of occurrence of read-probe pulses. Still a further object of this invention is to provide a programmable margin control system wherein read-probe pulses can be programmably selected to occur a predetermined time earlier than normally-timed read-probe pulses. Still a further object of this invention is to provide a programmable margin control system wherein the time of occurrence of read-probe pulses can be caused to occur a predetermined time later than normally-timed read-probe pulses. Still a further object of this invention is to provide programmably alterable read-probe pulses for automatically recovering data that cannot be read by normally timed read-probe pulses. Still a further object of this invention is to provide a programmable margin control system wherein the time of occurrence of read-probe pulses can be programmably altered without requiring the data-processing system to be stopped for manual switching. Yet another object of this invention, is to provide an improved programmable margin control system that permits the automatic variation in the time of occurrence of read-probe pulses without operator intervention.

BRIEF DESCRIPTION OF THE DRAWINGS

The foregoing mentioned general objectives of the invention together with more detailed and specific objectives, will become apparent from the consideration of the following descriptive material when viewed in light of the drawings, in which.

DESCRIPTION OF THE PREFERRED EMBODIMENT

Introduction

Figure 1:
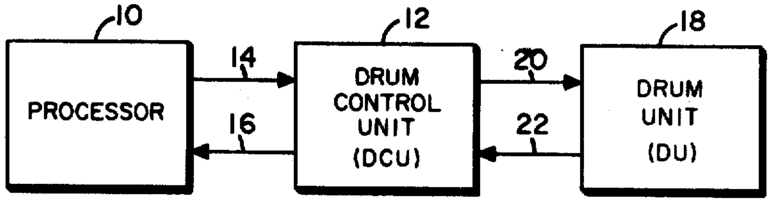
FIG. 1 is a block diagram of a data-processing system including a data processor, a drum control unit, and a controlled drum unit.

This invention finds particular application in electronic data-processing systems. Data-processing systems often utilize digital electronic computers to manipulate information signals represented and stored in the form of digitized data signals. These data signals are often in the binary number system where it is necessary only to distinguish 1's and 0's. One technique for storing data signals employs magnetizable material disposed on a movable surface. Some of these surfaces are formed in the shapes of cylinders and are made part of rotatable drum assemblies. These rotatable surfaces are normally each coated with a magnetizable material to form a layer which can be readily magnetically altered in discrete areas. After the surface is magnetically coated, it is often referred to as a record member. In the binary number system, the individual binary digits are commonly referred to as bits. A common form of recording format is one that has discrete portions of the magnetizable surface magnetized to one state of magnetic remanence for a binary 1, and in the opposite state of magnetic remanence for a binary 0. Various other forms of recording systems are well-known in the prior art. In order that the recorded data is readily available, transducers referred to as reading heads are arranged around the periphery of the movable surface and the record member is rotated, or moved at high speeds past the reading transducers. Transducer members have magnetic flux-defining pole pieces, generally referred to in the art as read-write heads, normally cooperate with the data-storage device to transmit data signals to be stored magnetically on the surface, and to read stored data signals from the surface. The position of each such head is used to define a track on the drum surface. These tracks can be grouped to define areas on the magnetizable surface that are referred to as bands or channels. As a selected area passes a selected transducer, information is read therefrom, or stored thereon, by the activation of the transducer which is disposed in a close proximity to the magnetizable surface, but out of contact therewith.

It is common in the prior art magnetic storage devices, including drum systems to provide as a minimum, prerecorded timing signals on the magnetizable surface, thereby providing a means for synchronizing the reading and recording on the surface, with a source of timing pulses that is formed by the same surface. The timing signals can be in the form of prerecorded timing pulses, or can be derived from knurled timing tracks, or any other well-known timing-track recording technique.

It has also been found in the prior art, that when more than one drum system is to be utilized as a part of a total memory system to be controlled by a single control circuit, that it is desirable to provide addressing signals on the surfaces of the various drums. These addressing signals are commonly referred to as "Angular Address" signals, and define the various addressable locations on the periphery of the magnetizable surface. These prerecorded Angular Address signals are desirable, in that the control unit can read the recorded Angular Address signals and compare them to a desired Angular Address, for activating the reading or recording operation upon the detection of coincidence. It is also common in the prior art drum systems that the various drum surfaces be provided with one or more sector marks, referred to as "word mark" pulses, thereby defining the starting or ending-location of recorded data words.

For a discussion of various timing signals arrangements, timing head arrangements, and other addressing considerations, attention is directed to copending application, referred to as application A, of Wesley R. Johnson, et al. Ser. No. 597,371, filed Nov. 28, 1966, and entitled Associated Plural Timing Track and Data Tracks, and assigned to the Assignee of this invention. It should be understood, of course, that various other timing track and control track arrangements can be utilized, and this is intended to be illustrative only.

It will be understood that various specific types of magnetic storage devices including drum systems, will have various arrangements as to the physical arrangement of the data-word storage and the control-signal storage on the magnetizable surface. The different formats result in requirements of different addressing-signal arrangements as well as different drum system selection signal requirements.

For an illustrative discussion of an access control unit that will accommodate various control instruction formats, reference is made to copending application, identified as application B, of Anthony R. Talarczyk, entitled Access Control For Plural Magnetic Memories, Serial No. 756,830, filed Sept. 3, 1968, and assigned to the assignee of this invention. Application B illustrates in block diagram form characteristic circuitry utilized in such an access control unit, and portions thereof will be described in more detail below.

Conventions Employed

Throughout the following description, and in the accompanying drawings, there are conventions employed that are familiar to those skilled in the art. Additional information concerning these conventions is set forth here. In the block diagram FIGS., a conventional full arrowhead is employed on lines throughout the drawings to indicate (1) a circuit connection, or (2) the direction of pulse travel, which is also the direction of control. In the logic diagram FIGS., a conventional filled half-arrowhead is employed to indicate (1) a circuit connection, and (2) a logical 0 signal impressed on the line to achieve a desired output signal. A logical 0 signal for this embodiment is a "high" signal and is approximately ground potential. A conventional unfilled half-arrowhead is employed in the logic diagrams on lines to indicate (1) a circuit connection, and (2) a logical 1 signal impressed on the line to achieve a desired output signal. For this embodiment, a logical 1 signal is a "low" signal and is approximately −4.5 volts.

Bold-face characteristics appearing within a logic block diagram symbol identify the common name for the circuit represented; that is, a common bistable flip-flop is identified as FF, a toggle flip-flop is identified by TFF, a logical AND circuit is identified as A, and a logical OR circuit is identified as OR. In addition to the bold-face characters just enumerated for illustrative purposes, associated numerical designations will identify the stages of the circuit identified by the bold-face character for registers, or the rank of logic.

The logic circuits utilized to embody this invention are available commercially, and can readily be selected by those skilled in the art. Many of the circuits illustrated in the logic diagrams of this invention can be selected from those illustrated in U.S. Pat. No. 3,355,718 to A. R. Talarczyk, entitled "Data-Processing System Having Programmably Variable Selection for Reading and Recording Interlaced Data on a Magnetic Drum," Ser. No. 478,885, issued Nov. 28, 1967, and assigned to the Sperry Rand Corporation, the assignee of this invention.

In the description, the general arrangement of the apparatus will be first described with respect to the manner to which the various circuit components and the apparatus are interconnected and in respect to the general overall operation which is performed. The description of the general arrangement will be followed by separate and more detailed description of the various logical arrangements and circuitry which so require it, to particularly point out the operation of the invention within this embodiment. It should be understood that various portions of the access control circuit that do not particularly pertain to this invention have been eliminated from this discussion in order to clearly set forth the inventive concept.

Data-Processing System

FIG. 1 illustrates a simplified block diagram of a data-processing system in which the subject invention can be utilized. In this characteristic data-processing system the Processor 10 can communicate with a Drum Control Unit (DCU) 12 by cables 14 and 16. The Processor 10 supplied control instructions over cable 14 to Drum Control Unit 12, for causing the DCU to establish communication with a Drum Unit (DU) 18. The DCU operates on the control instructions and establishes control signals that are transmitted over cable 20 to the Drum Unit. These control signals include such items as the addressing signals, the selection of reading or writing, and the selection of the time of occurrence of the read-probe pulses. In response to these control signals, the Drum Unit 18 transmits data signals and control signals over cable 22 to the Drum Control Unit. The Drum Control Unit 12 operates to check parity on data signals read from the Drum Unit, and when correct parity is found transmits the data over cables 16 to the Processor 10. In those instances when parity error is determined to exist, DCU sends an error code to Processor 10. A block diagram configuration of the major portions of the DCU is shown in FIG. 1 of application B, referenced above. Since a detailed discussion of the internal workings of the DCU would not appreciably add to an understanding of the invention, only those portions that relate to the determination of the timing of the read-probe pulses will be discussed.

Control Instruction Format

Figure 8:
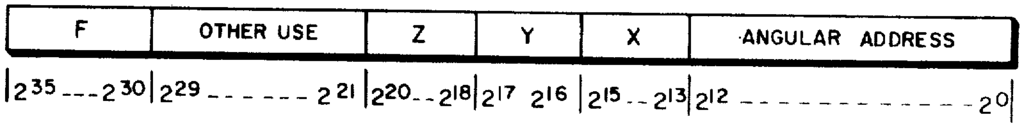
FIG. 8 illustrates the format of a characteristic control instruction.

Turning to a consideration of FIG. 8, which is a representation of the control instruction format, it will be seen that there are 36 bits utilized in the definition of the control instruction, as submitted by the Processor 10 to the Drum Control Unit 12. It will be recognized that the control instruction format is that set forth for a particular type of Drum Unit 18. As pointed out in application B the Drum Control Unit 12 can be capable of handling more than one type of Drum Unit. For other types of Drum Units, the control instructions format could be different. The type of Drum Unit that is accessed and controlled by the control instruction format of FIG. 8 is that of a mass-storage drum system available commercially from the Univac Division of Sperry Rand Corporation and is identified as the FH1782 Drum System. Such a mass-storage Drum System is capable of storing 2,097,152 30 or 36-bit data words, with an average access-time of 17 milliseconds and a maximum access-time of 34 milliseconds. The control instruction format utilizes the lowest order 13 bits to designate the angular address. The next higher order three bits are utilized to define the X portion of the head selection. The next higher order two bits are utilized to define the Y portions of the head selection. The next higher order three bits are utilized to define the Z portion of the head selection signals. Bit positions $2^{21}$ through $2^{29}$ are utilized for other functions that are not relevant to the consideration of this invention and includes such elements as drum unit selection, drum type selection and the like. Finally, bit positions $2^{30}$ through $2^{35}$ define the function that is to be performed. The function code is referred to as F. The above identified patent sets forth many of the functions that can be performed in a characteristic Drum Unit. Particular attention for this invention is directed at three specific functions. These are referred to as the Read Normal, Read Early, and Read Late functions. Table I illustrates these functions together with the numerical designations specifying each.

TABLE I

| Operation | Function code | |
|---|---|---|
| | Octal | Binary |
| Read early | 41 | 100 001 |
| Read normal | 42 | 100 010 |
| Read late | 43 | 100 011 |

From a consideration of the binary coding in Table I, it can be seen that the highest order four binary digits of $1000_2$ designates one of the three possible Read instructions. The translation of the lower ordered two digits indicates the programmable selection of the time of occurrence of the read-probe pulses for a given read operation. These function-defining signals together with the address-defining signals of the control instructions will be referred to and discussed in more detail below.

Read-Pulse Timing

Figure 2:
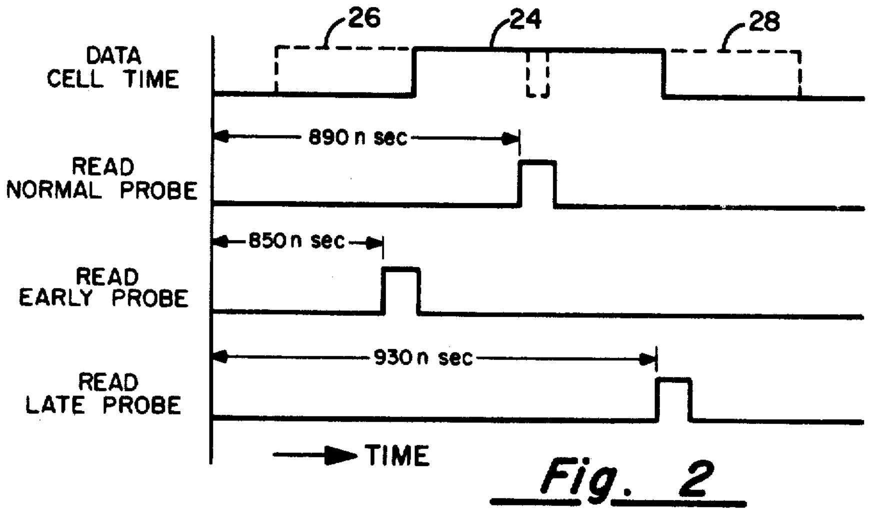
FIG. 2 is an idealized timing diagram illustrating a data cell time, a normal read-probe pulse, an early read-probe pulse, and a late read-probe pulse, and illustrates how they relate to shifted data cell times.

In FIG. 2 there is shown idealized waveform drawings of the various programmably actuatable read-probe pulses as they relate to a data cell time. The waveform identified as Data Cell Time has the data cell period identified as the solid-line excursion from the reference and labeled 24. It will be noted that the Read Normal read-probe pulse is arranged to occur approximately in the middle of the normal Data Cell Time 24. For this embodiment, the normal read-probe pulse occurs approximately 890 nanoseconds after its selection is enabled. Again referring to the Data Cell Time waveforms there is shown a dashed waveform 26 occurring earlier in time than the normal Data Cell Time 24. This early Data Cell Time 26 is shown in dashed line, and will be seen to be beyond the period of the normal read-probe pulse. Accordingly, data occurring in the early Data Cell Time 26 cannot accurately be read by the normal read-probe pulse. For such a marginal operation, it is necessary to establish Read Early read-probe pulse. It will be seen that the early read-probe pulse occurs approximately 850 nanoseconds from the time the early read-probe pulse circuitry is selected. The early read-probe pulse can be seen to occur within the time span of the early Data Cell Time 26. Alternatively, if the Data Cell Time occurs later than normal Data Cell Time 24, it can be in the position identified in dashed line as 28. In order to recover data recorded in such a late Data Cell Time it is necessary to enable the Read Late read-probe pulse. The Read Late read-probe pulse occurs approximately 930 nanoseconds after the selection is made. For this embodiment, then, it can be seen that there is approximately a 40 nanosecond interval between successive types of the read-probe pulses. Of course, the timing at margins will be accommodated to the particular type of magnetic Drum Unit that is being programmably controlled. It should be noted also that the overlap in Data Cell Times need not be precisely as shown, but may be more or less removed from the normal Data Cell Time. Of course, if the Data Cell Times 26 and 28 are either too early or too late, respectively, to coincide with the early read-probe pulse or the late read-probe pulse it will be unable to read the data. The detailed logic together with the timing and enabling circuits will be described in more detail below.

Magnetic Memory System

Figure 3:
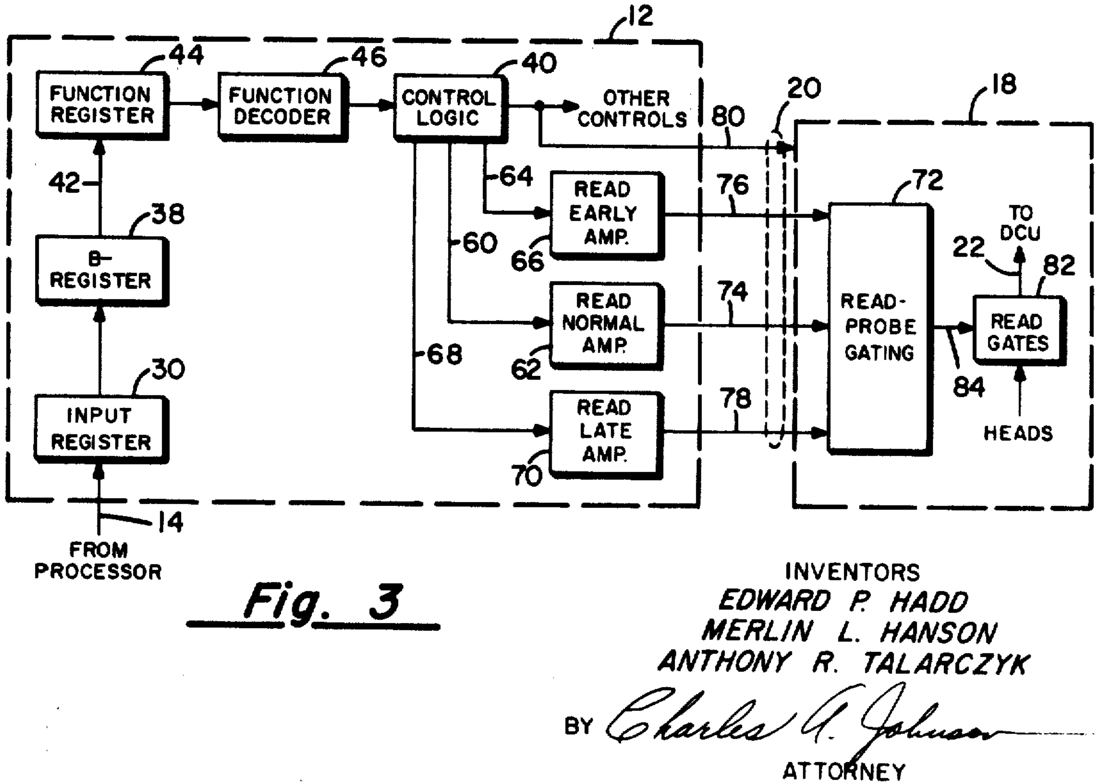
FIG. 3 is simplified block diagram illustrating a portion of the drum control unit for selecting the time of occurrence of the read-probe pulses, and a portion of the drum unit that responds to the programmably selected read-probe pulses.

FIG. 3 is a simplified block diagram of that portion of the magnetic memory system illustrating the part of the Drum Control Unit that provides for programmably altering the time of occurrence of read-probe pulses, and the part of the Drum Unit that responds to such read-probe pulses for determining the time of occurrence of read operations. The part of the Drum Control Unit is shown enclosed in dashed block 12 and the part of the Drum Unit shown enclosed in dashed block 18. An input register 30 is illustrated for receiving the control instructions from a Processor over cable 14. At the appropriate time, such a control instructions are passed to the B register 38. The F portion of the control instruction is passed over cable 42 to the Function Register 44 where it is stored pending its decoding, often referred to as translation. The F portion is transferred to the Function Decoder 46 at the appropriate time where signals are directed to the Control Logic 40 dependent upon the nature of the function that is specified. While it is understood that various functions can be thus translated, only the Read Normal, Read Early, and Read Late functions are considered here, and all other control operations are omitted for the sake of clearly describing the operation of this invention. When the Function Register 44 stores a Read Normal function code of 42, the Function Decoder 46 will provide the appropriate signal to Control Logic 40 for issuing an enabling pulse on line 60 to the Read Normal Amplifier 62. When a Read Early function code is stored in the Function Register 44, the Function Decoder 46 will cause the Control Logic 40 to issue an enable signal on line 64 to the Read Early Amplifier 66. Finally, when a Read Late function code is stored in the Function Register 44, the Function Decoder 46 will cause the Control Logic 40 to issue an enable signal on line 68 to the Read Late Amplifier 70. The Amplifiers 62, 66 and 70 are coupled to the Read-Probe Gating 72 in the Drum Unit 18, by way of conductors 74, 76, and 78 respectively, in cable 20. The other control signals necessary for determining the operation of the drum unit 18 are provided by conductors referred to as 80 and included in cable 20. These other control signals will include such controls as the selection of read or record operations, the activation of the Drum Unit 18, and the X, Y, and Z portions of the addressing control signals. For this block diagram, it is assumed that the appropriate heads have been selected and that Read Gates 82 are in a condition to receive the appropriate read-probe pulse from the Read-Probe Gating 72 over cable 84. When so probed, the Read Gates 82 will provide the information read from the head over cable 22 to the Drum Control Unit for purposes of checking parity. Having considered the general relationship of the functional units of this invention, attention will be directed to a more detailed consideration of the block diagram arrangement of the drum unit.

Figures 4, 4A:
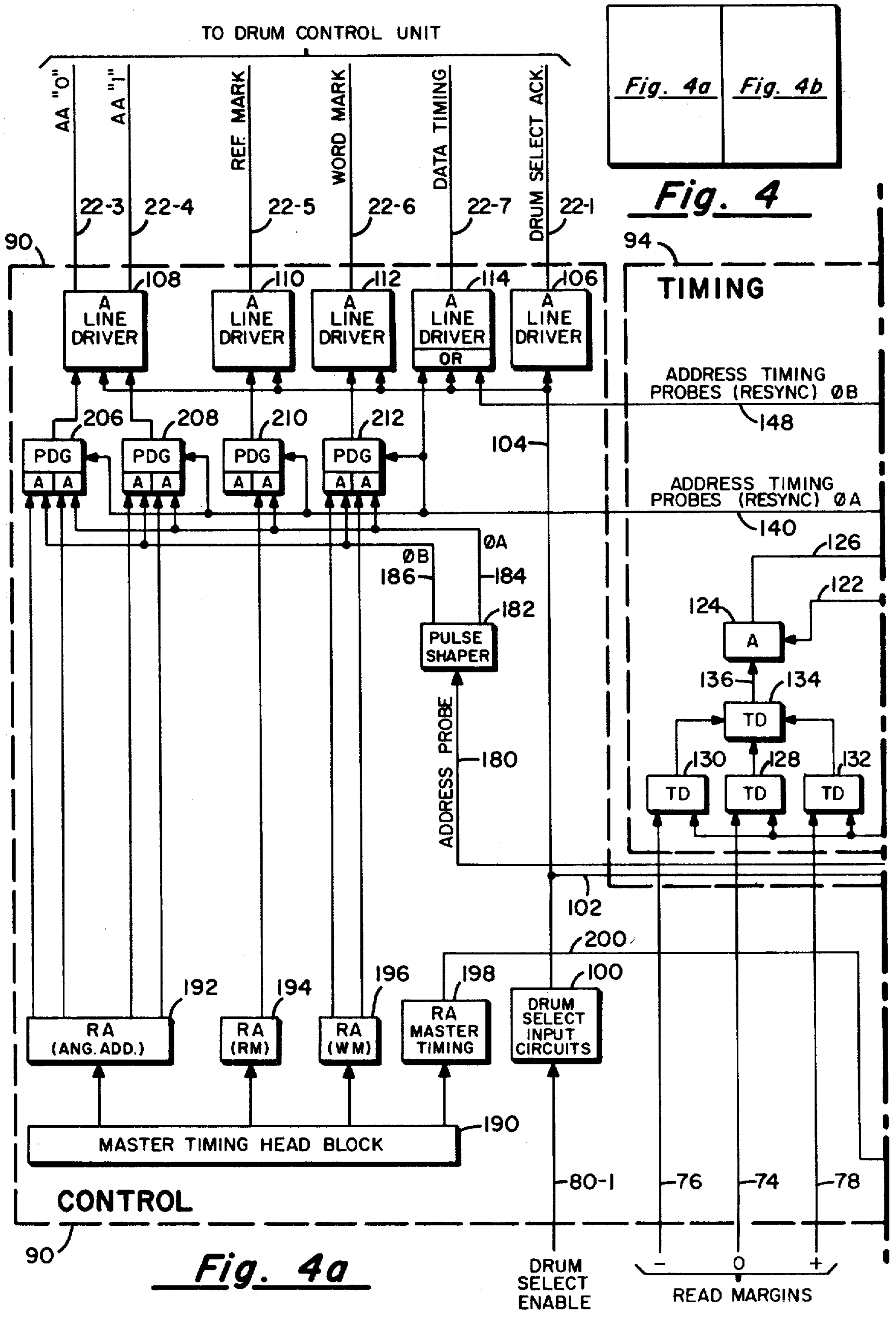
FIGS. 4*a* and 4*b*, when arranged as illustrated in FIG. 4, are a more detailed block diagram of that portion of the drum unit that controls the time occurrence of the read-probe pulses.
Figure 4B:
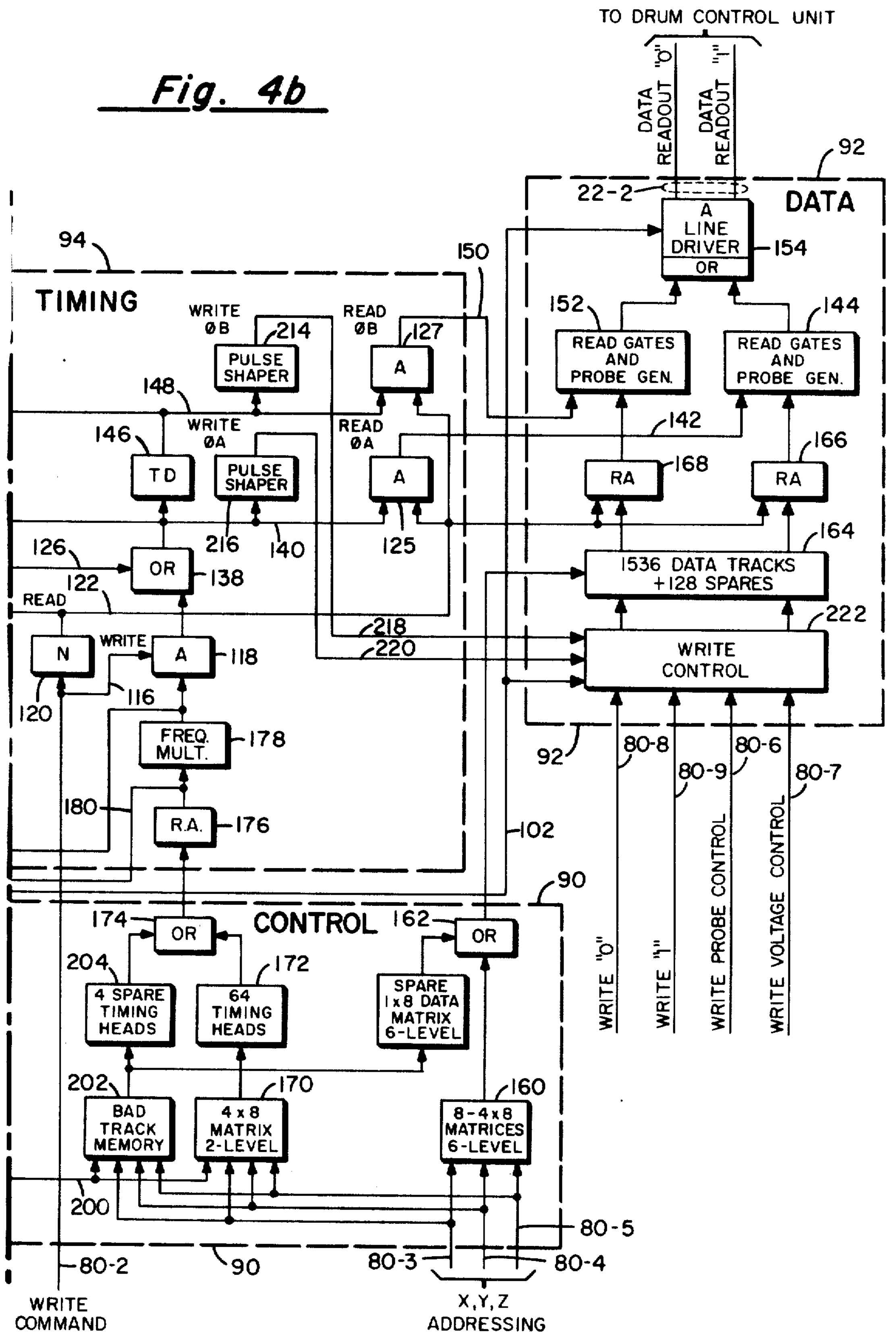

FIGS. 4*a* and 4*b*, when arranged as shown in FIG. 4 are a more detailed block diagram of that portion of the Drum Unit 18 that is relevant to the control of the reading operation wherein the response is made to the programmable selection of the timing margins for the occurrence of the read-probe pulses. Many of the timing elements of a Drum Unit similar to that illustrated in FIGS. 4*a* and 4*b* are discussed in detail in copending application A. Accordingly, the discussion will be limited to a functional consideration. In FIGS. 4*a* and 4*b*, the Control portion of the Drum Unit is shown enclosed in dashed block 90, the Data handling portion of the Drum Unit is shown enclosed in dashed 92, and the Timing portion of the Drum Unit is shown enclosed in dashed block 94. One of the control signals presented to the Drum Unit in cable 80 is the Drum Select Enable provided on line 80–1 to the drum select input circuits 100. These circuits operate to enable the internal circuitry of the particular Drum Unit by providing an enable signal on line 102, and operates also to provide a selection signal for line 104 for driving the line driver circuit 106 that provides the drum select acknowledge on output line 22–1 to the Drum Control Unit. This select enable signal is also provided to enable the Angular Address line driver 108, the Reference Mark line driver 110, the Word Mark line driver 112, and the Data line driver 114.

Another input signal to the drum unit is the Write Command signal received on line 80–2 from the Drum Control Unit and is utilized for providing a Write Command enable signal on line 116 to AND circuit 118. The absence of a Write Command signal on line 80–2 will result in Inverter 120 providing a Read enable signal to line 122. The Read signal on line 122 is utilized for enabling circuit 125 for Read Phase A and circuit 127 for Read Phase B. Further, the Read enable signal is utilized to gate AND circuit 124 for establishing the time of the read-probe pulse on line 126. The Read Normal-probe pulse selection signal received on line 74 is directed to time delay circuit 128. The Read Early read-probe selection signal received on line 76 is directed to time delay circuit 130. The Read Late read-probe selection signal received on line 78 is directed to time delay circuit 132. Each of these time delay circuits 128, 130, and 132 have their output terminals directed to times delay circuit 134 which in turn provides its output signal on line 136 as the second input to AND circuit 124. Therefore, when the read signal is presented on line 122 and time delay circuit 134 has provided its pulse, AND circuit 124 will provide the signal on line 126 to OR circuit 138 for providing the signal on line 140 to AND circuit 125 that will cause AND circuit 125 to provide the Read Phase A pulse on line 142 to Read Gates and Probe Generators 144 for phase A. OR circuit 138 also provides this output signal to time delay circuit 146 for its output terminal provides a signal on line 148 to AND circuit 127, which in turn provides the Read Phase B enable signal on line 150 to Read Gates and Probe Generators 152 for providing the phase B reading operation. The output terminals of Read Gates and Probe Generators 144 and 152 are directed to the OR input terminals of the line drivers 154 for providing the readout of data signals of 0 and 1 on lines 22–2 to the Drum Control Unit where the data signals will be checked for parity.

The Control portion 90 receives input signals from the Drum Control Unit on lines 80–3, 80–4, and 80–5 for defining the X, Y, and Z addressing signals, respectively. The signals received on these lines are as a result of the operation by the Drum Control Unit on the portions of the control instruction presented to the Drum Control Unit by the Processor. The input signals received are translated in the 8–4X8 matrices 160 for driving the OR circuits 162 for selecting the appropriate ones of the data tracks 164. The read amplifiers 166 and 168 associated with phase A and phase B, respectively, are enabled by the read signal on line 122. The input XYZ signals are also directed to the 4X8 matrix 170 for selecting the appropriate ones of the timing heads 172. The selected timing heads provide output signals to OR circuit 174 for driving circuit 176, which in turn, operates to drive the frequency multiplier 178 for providing the timing input to AND circuit 118. The output from circuit 176 is also taken on line 180 to the address probe pulse shaper 182 where phase A pulses are provided on line 184 and phase B pulses are provided on line 186 for controlling the reading of the addressing signals to the Drum Control Unit.

For addressing the particular word to be read from the Drum Unit, a master timing head block 190 is utilized to prerecorded signals. These prerecorded signals comprise the Angular Address signals, which are read by the Angular Address read amplifier 192; the Reference Mark, which is read by the Reference Mark read amplifier 194; the Word Mark, which is read by Word Mark read amplifier 196; and the Master Timing signal which is read by read amplifier 198. Read amplifier 198 provides a signal on line 200 to the bad-track memory circuitry 202 for selecting the appropriate ones of the spare timing heads 204 for those instances where bad-track timing is required. For a consideration of spare track timing, see copending application A. When appropriately timed by pulse shaper 182, circuits 206, 208, 210, and 212 operate to drive line drivers 108, 110, and 112 for providing the Angular Address signals on lines 22–3 and 22–4, the Reference Mark on line 22–5, the Word Mark on 22–6, and the Data Timing signal on line 22–7. These signals are directed to the Drum Control Unit and are utilized for controlling its internal operation in referencing data in the Drum Unit.

Since, this invention relates primarily to reading of information, the portion of the circuitry dealing with writing has been much simplified herein. Upon the occurrence of a Write Command signal on line 80–2, AND circuit 118 will drive OR circuit 138, which in turn will drive time delay circuit 146 for providing an enable signal to write phase B pulse shaper 214. Write phase A pulse shaper 216 receives its input on line 140 from OR circuit 138. The output signals from pulse shapers 214 and 216 are provided on line 218 and 220, respectively, to the write control logic 222. The write control logic receives input signals of the write probe control on line 80–6 and the write voltage control line 80–7 from the Drum Control Unit. Additionally, a write O signal will be provided on line 80–8, or write 1 will be provided on line 80–9 for determining the logic level that will be recorded. The output from the write control 222 is directed to the selected ones of the data track heads 164.

From a consideration of the foregoing discussion, it can be seen that the read-probe selection signals received on line 74, 76, and 78 together with the read command received on line 80–2 and the XYZ addressing received on lines 80–3, 80–4, and 80–5, operate to establish the timing of the probing of the read amplifiers. Additionally, these signals establish the timing of the reading out of the control signals to the Drum Control Unit. It is felt the foregoing provides a basic description of the operation of the Drum Unit and how it responds to the externally applied control signals received from the Drum Control Unit for performing the programmably alterable selection of the time of occurrence of read-probe pulses.

Drum Unit Read-Probe Logic Circuitry. Having considered the block diagram arrangement of the Drum Unit, with attention directed to the reading operations, attention is directed to FIG. 5 which is a detailed logic diagram of that portion of the Drum Unit that responds to the read-probe selection signals provided by the Drum Control Unit and operates to adjust the time of occurrence of the read-probe pulses in the Drum Unit. In the logic figure, elements that have been referred to in the block diagram will carry the same reference numerials. Those elements that appear individually in FIG. 5, but which have been grouped in the block diagram will be referred to individually.

The selection of the mode of operation for the time of occurrence of the read-probe pulses is established by one of lines 74, 76, or 78 receiving a high signal in conjunction with the Drum Select signal received on line 80–1 from the Drum Control Unit. The Read Normal read-probe pulse selection on line 74 is directed as one of the inputs to AND circuitry A0128, labeled 200; the Read Early read-probe pulse for line 76 is directed to AND circuit -A0127, labeled 202; and the Read Late read-probe signal selection for line 78 is directed to the AND circuit A0129, labeled 204. The operation of these AND circuits is such that it requires a low signal on each input line in order to provide a high output signal. Alternatively, a high signal on any input terminal will result in a low output signal. Therefore, for proper selection, only one of the input lines to circuits 200, 202, and 204 will be high while the other two input lines will be low. The selection of the appropriate line will be made in response to the F portion of the control instruction, and will be described in the detailed consideration of FIG. 6 below. The output from the Read Early AND circuit is directed to time delay circuit 130, which for this embodiment provides a 200 nanosecond delay of the applied pulse to its output terminal. This delayed pulse is applied as one of the input signals to time delay circuit 134. Therefore, if the Read Early read-probe pulse is selected by a high on line 76, there will be a 560 nanosecond delay from the time the selection pulse is applied to circuit 202 until it propagates through time delay circuit 130 and time delay circuit 134, and ultimately it is applied to circuit 124. When a high signal is applied on line 74 to AND circuit 200, which there will be a low signal at its output signal applied as an input to time delay circuit 128. The time duration for the delay of the normal read-probe pulse selection is 240 nanoseconds, and is applied as a second of the inputs to time delay circuit 134. It follows then, that there is a total delay of approximately 600 nanoseconds from the time the selection pulse is applied to AND circuit 200 until it appears as an input to circuit 124. Finally, when a high input signal is applied to circuit 204, the output will be gated to time delay circuit 132, which comprises a 280 nanosecond delay. The output from circuit 132 is applied as the third input to time delay circuit 134. Therefore, the total time delay for the late read-probe pulse selection is 640 nanoseconds. Ultimately, whichever of the input selections is made, there will result in an output signal from circuit 124 on line 126 that is directed to OR circuit 138. The output signal from OR circuit 138 is directed to AND circuit 125 for providing the Phase A data read probes on line 142 when gated, and is also directed to time delay circuit 146 which comprises an additional 290 nanoseconds delay. Ultimately, the output from time delay circuit 146 will be provided both to the write control circuitry (not shown) and to circuit 127 for providing the phase B data probe at the output line 150. The waveforms shown in FIG. 2 are illustrated for the phase B timing. It is clear Phase A timing durations would each be decreased by 290 nanoseconds. For this gating, the appropriate signal is provided on line 80–2 from the drum control unit and results in an output on line 122 from Inverter circuit 120 that enables the read operation as described above. 176 The circuitry referred to as 176 in the block diagram of FIG. 4*b* is shown enclosed in dashed block 176, and comprises the circuit A0119, labeled 176–1, for reading the timing signals and driving the read amplifiers circuit 176–2. The output from the read amplifier 176–2 is utilized to drive the drivers 176–3, and as input to the frequency multiplier, shown enclosed in dashed block 178. The pulse shapers are shown enclosed in dashed block 182, and are comprised of circuits 182–1 for providing the phase A timing pulses and circuits 182–2 for providing the phase B timing pulses.

The frequency multiplying circuitry 178 is comprised of frequency multiplying circuit 178–1 and drivers 178–2, which provide input signals to gating circuit 178–3. The output from gating circuit 178–3 is provided as an input to AND circuit 118 in conjunction with the select signal provided on line 116.

Figure 5:
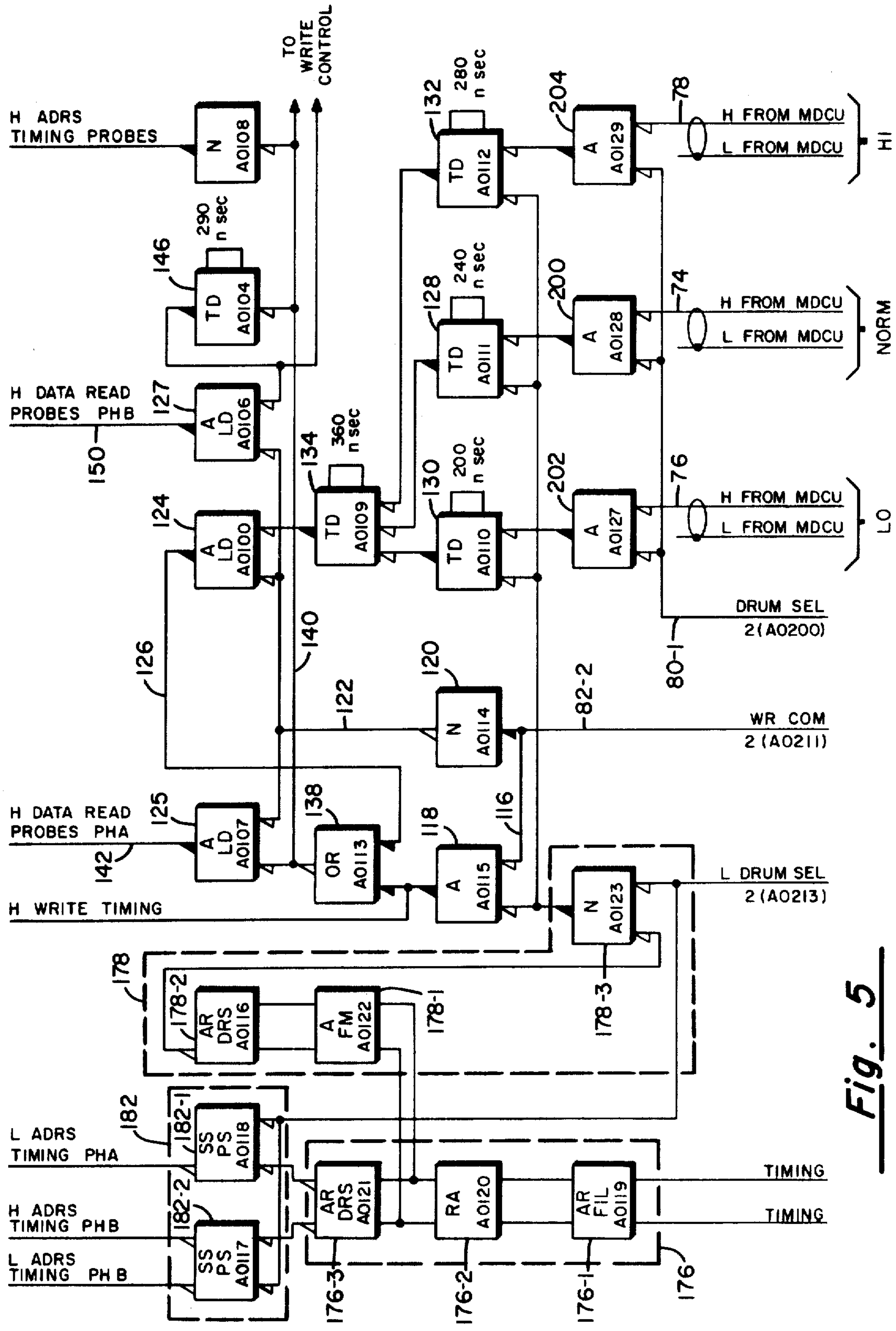
FIG. 5 is a logic diagram of the specific circuitry utilized for responding to read-probe pulses selection signals for providing the particular timed read-probe pulses selected.

It can be seen, therefore, that the logic circuitry of FIG. 5 will provide response to the programmable selection of the time of occurrence of read-probe pulses by appropriately delaying the application of the read-probe pulses to the read gates.

It should be pointed out at this time, that the physical nature of the time delay circuit 128, 130, 132, 134, and 146 can be selected from any commercially available circuits that will provide the appropriate delay intervals. For instance, these can be discrete circuits, as shown in the logic diagram, or can be tapped delay lines with gated inputs for providing the output signal at the appropriate time dependent upon the gated application to one of the input taps.

It should be pointed out also, that the precise time delays illustrated in the preferred embodiment relate to the timing requirements for a particular type of magnetic drum unit, and it would be apparent to one skilled in the art how to modify the timing circuitry delays to accommodate different reading time spans for different magnetic memory units.

Figure 6:
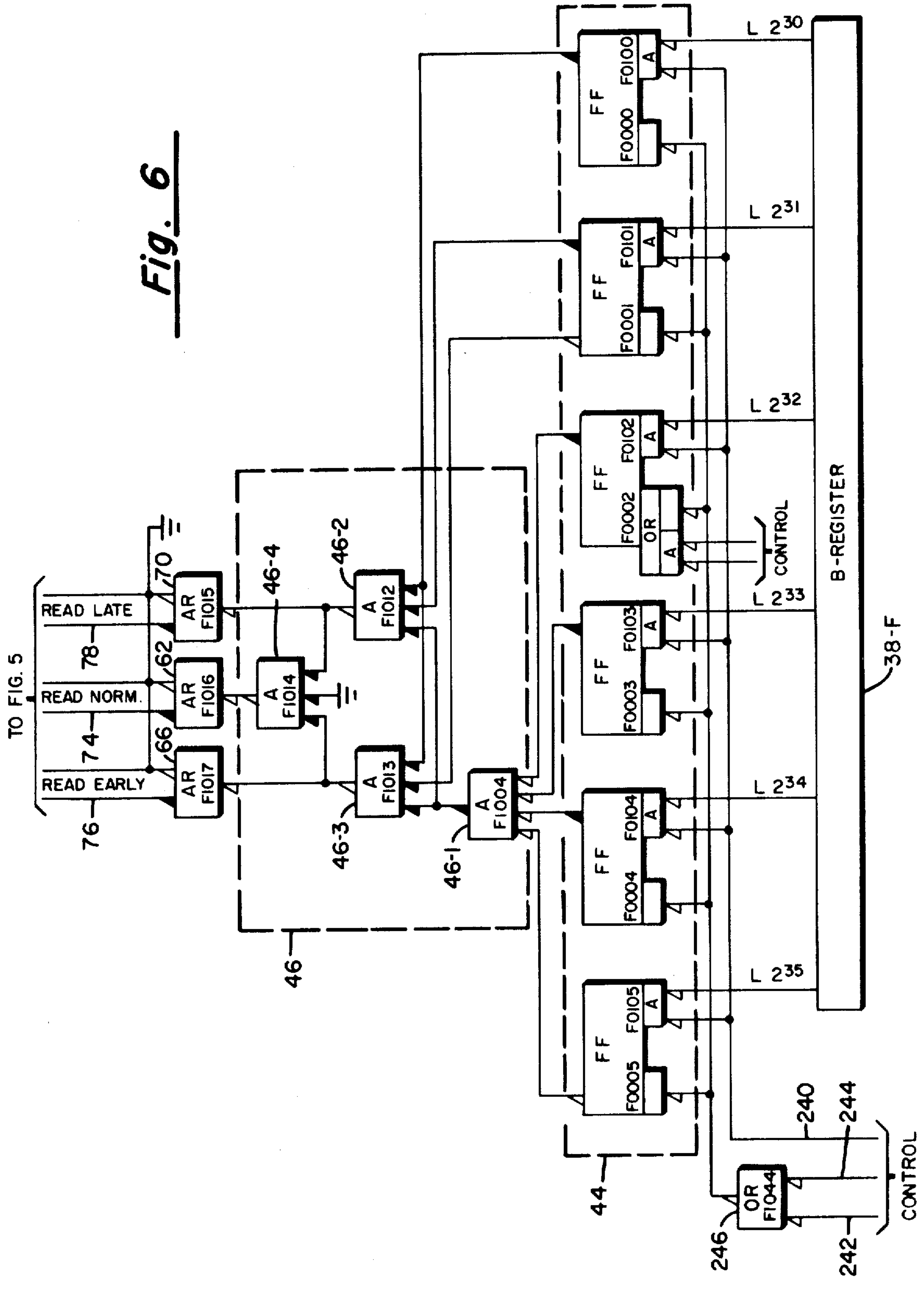
FIG. 6 is a logic block diagram of that portion of the drum control unit that translates the control instruction for selecting the time of occurrence of the read-probe pulse.

Control Instruction Function Translation. FIG. 6 is a detailed logic block diagram of that portion of the circuitry in the Drum Control Unit that temporarily stores the F portion of the control instruction, provides the translation thereof, and issues the appropriate selection of signals for the time of occurrence of the read-probe pulses to the Drum Unit. Referring briefly to FIG. 3, it will be recalled that the B register 38 receives the control instruction from the processor. In FIG. 6, the portion of the B register 38 is referred to by reference numeral 38-F and will be comprised of stages $2^{30}$ through $2^{35}$. These highest order stages of the control instruction comprise the F portion. The remainder of the stages of the B register are not illustrated in FIG. 6 and are of no interest to this detailed consideration. The output signals from the stages $2^{30}$ through $2^{35}$ are provided as setting input signals to flip-flop circuits F—00 through F—05, respectively. The flip-flops will be set when gated by a signal received from the control portion of the Drum Control Unit on line 240. It can be seen that in order to set a particular stage to provide a low output at the set output terminal, that is the leftmost output terminal, there must be simultaneous occurrence of a low input signal from the appropriate stage of the B register together with the low gating signal on line 240. In order to clear flip-flops F—00 through F—05, signals are provided on lines 242 and 244 to OR circuit 246, the output of which is applied to the clear input terminals of each of the flip-flops. It is necessary only to consider that the flip-flops are in the cleared state prior to the issuance of the gating signal on line 240 for setting the respective stages for temporarily storing the F portion of the control instruction, and further details of the generation of clearing signals need not be set forth.

It should be pointed out, that the output signals from the Function Register 44 will be directed to Function Decoder circuitry (not shown), other than that shown enclosed in dashed block 46, for decoding those other Drum Unit Functions other than those that relate to the determination of the time of occurrence of the read-probe pulses.

In FIG. 6 that portion of the circuitry shown enclosed within dashed block 46 is the Function Decoder circuitry associated with the determination of the time occurrence of the read-probe pulses. It will be seen that AND circuit F1004, labeled 46-1 receives input signals from the SET side of F—05, and the Clear side of flip-flops F—04, F—03, and F—02. In this configuration, it will be seen that it is necessary that there be all four low input signals to the input terminals of AND circuit 46-1 in order to provide the high output terminal at that circuit. Referring to Table I, it will be seen that in order to have this bit-configuration, it will be necessary that the highest order four binary digits be $\mathbf{1000_2}$ to have this condition satisfied. The octal digit will be a $\mathbf{4_8}$ with the highest ordered binary portion of the lower ordered octal digit being a 0. In the absence of this combination the function portion of the control instruction is some other operation that is not related to the determination of the time of occurrence of the read-probe pulses and other circuitry (not shown) in the Function Decoder 46 will be in operation. When the highest order four binary digits are $\mathbf{1000_2}$, the lower ordered 2 digit positions will then make the final selection. The output terminal of AND circuit 46-1 is directed as gating input signal to circuits F1012, labeled 46-2, and F1013, labeled 46-3. The AND circuit 46-3 performs the function of selecting the Read Early read-probe pulses, and the AND circuit 40-2 performs the selection of the Read Late read-probe pulses. For the Read Early selection, it will be recalled from TAble II that a code of $\mathbf{41_8}$ is the selection. In binary, the provides a $\mathbf{01_2}$ bit arrangement for the lowest ordered 2 binary digits. AND circuit 46-3 receives as an input, signals from the SET output terminal of flip-flop F—01 and the CLEAR output terminal of flip-flop F—00. Therefore, when the lowest ordered stage F—00 is storing a 1 there will be a 0, or high signal, at its CLEAR output terminal to AND circuit 46-3. Also, if the flip-flop stage F—01 is storing a 0, there will be a 1 or high signal, at the SET output terminal to AND circuit 46-3. For this condition all inputs to AND circuit 46-3 are high, and a low signal will be provided at the output to AND circuit F1014, labeled 46-4, and to the driver F1017, labeled 66. The low signal to driver circuit 66 will result in a high output signal on line 76, thereby indicating the selection of the Read Early form of read-probe pulse. Also, the low signal to AND circuit 46-4 will cause it to provide a high signal to driver circuit F1016, labeled 62, thereby providing a low signal on its output line 74. This will indicate that the Read Normal is not selected. Next returning to a consideration of AND circuit 46-2, it will be seen that in addition to the gate signal from AND circuit 46-1, and the output signal from CLEAR output terminal F—00, it receives an input from the CLEAR output terminal of F—01. For the Read Early selection, stage F —01 will be providing a low signal at its CLEAR output terminal, thereby causing AND circuit 46-2 to provide a high signal at its output terminal. This high signal is directed to AND circuit 46-4, and will not affect its operation, and to the driver circuit 70 where it will cause a low output signal on line 78. From this consideration, it will be seen that the only output line carrying a high signal is line 76, thereby selecting a Read Early read-probe pulse.

Next considering the Read Normal selection of read-probe pulses, it will be recalled from Table I that the F portion of the control instruction is $\mathbf{42_8}$. The operation of AND circuit 46-1 will be the same as that previously described. For this function, the lowest ordered stage F—00 will store a 0, thereby providing a low at its CLEAR output terminal. Since the low signal is taken both AND circuits 46-2, and 46-3, the output signals will be high for both of these circuits. These two high output signals will cause driver circuits 66 and 70 to provide low output signals. Additionally, this will provide the input requirements for AND circuit 46-4 such that it will provide a low output signal to driver 62. In turn, driver 62 will provide the high selection signals on line 74.

Finally, for the consideration of the Read Late selection of the read-probe pulses, the entry in Table I will indicate that the code is $\mathbf{43_8}$. A $\mathbf{43_8}$ in binary will find both of the lowest ordered stages, that is F—01 and F—00, in the state. When in the 1 state, the CLEAR output from the lowest ordered stage F—00 will be a high, and the output from the CLEAR side of stage F—01 will be a high. This will complete the selection requirements for AND circuit 46-2. With all inputs signals thereto in the high state, a low output signal will be directed to driver 70. This low will be inverted by driver 70 for providing the high output signal on line 78. The low output signal will also be directed to AND circuit 46-4 and will cause it to provide the high output signal to driver 62, and in turn, the low output signal to line 74. Since the stage F—01 is storing a 1, there will be a low signal directed to AND circuit 46-3 and will cause it to provide a high output signal which will be directed to driver 66, thereby causing it to present the low output signal on line 76.

The foregoing has been a detailed description of the three possible programmable selections of a time of occurrence of read-probe pulses.

Figure 7:
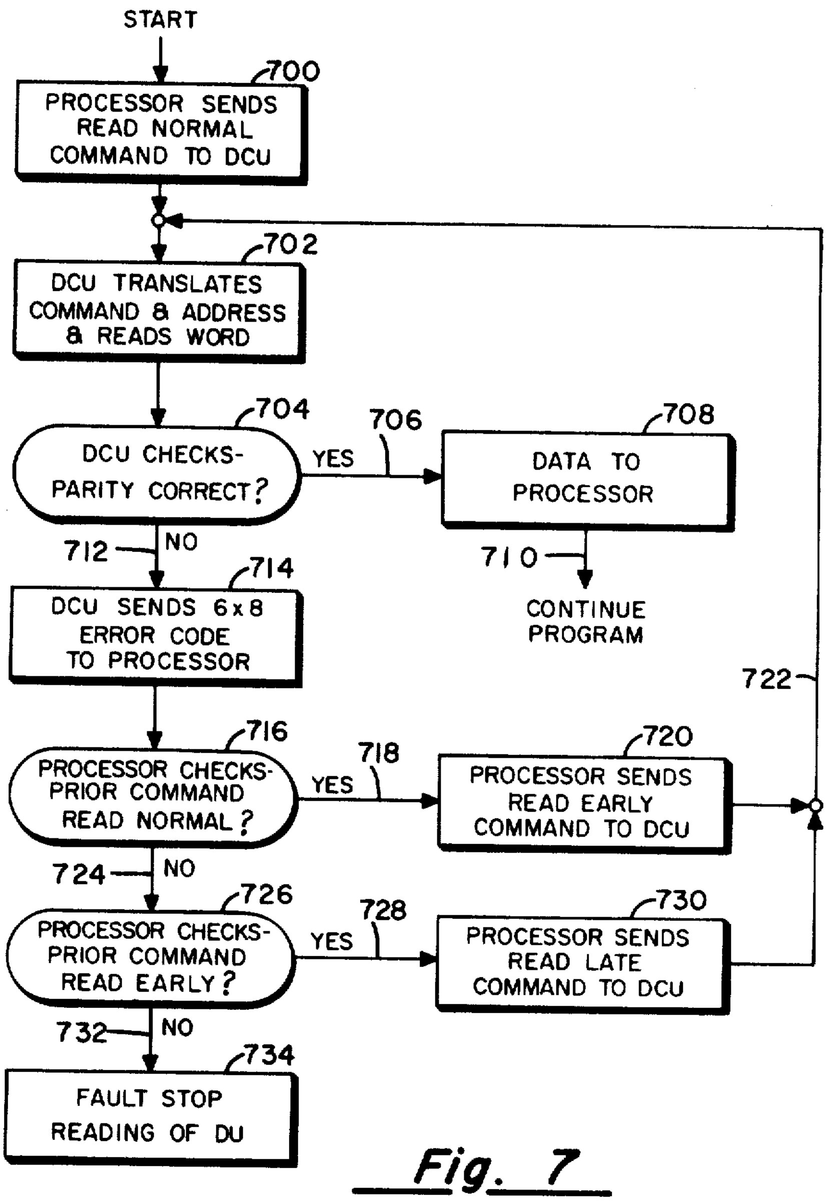
FIG. 7 is a flow diagram illustrating how the subject invention can be utilized in a processor to automatically program the selection of the time of occurrence of read-probe pulses for attempting to recover data that cannot be normally read.

Operation. Next turning to a consideration of FIG. 7, there is shown a flow diagram of a process in which the programmable selection of the time of occurrence of read-probe pulses can be utilized. In the flow diagram, the representation of rectangular boxes are that of functional steps, and the oval boxes are that of decisions that must be made. It is assumed that the data processing system of the type shown in FIG. 1 is in operation and that the processor has preprogrammed the recovery procedure shown in FIG. 7.

In the usual procedure of the occurrence of the use of a magnetic storage system, it will be assumed that the Processor sends a Read Normal command to the Drum Control Unit, as shown by block 700. This command would be of the format illustrated in FIG. 8 with the address specified in the bit positions $2^0$ through $2^{20}$ and the F portion set at the function code $42_8$. The processor having sent the Read Normal command instruction to the DCU, the DCU translates the Function code command and addresses, and reads the word from the magnetic Drum Unit, as shown by block 702. This operation would be that described in conjunction with FIGS. 5 and 6 in the detailed logic. Having read a word from the Drum Unit to the DCU, the DCU performs the check on parity, as indicated by decision elements 704. If parity is found to be correct for the message read, the "Yes" path 706 is taken and the data is read to the Processor, as indicated in block 708. For the usual operation, path 710 will be taken and the program would continue either to operate on the message so read or read additional messages. In the event that the DCU parity check results in an incorrect parity, the "No" path 712 is taken and the DCU sends an error code to the Processor, as indicated by block 714. When the processor detects the error code, it enters the recovery routine automatically, and the Processor checks to determine whether the prior command issued to the DCU was a Read Normal command, as indicated by block 716. If the prior command was Read Normal, the "Yes" path 718 is taken, and the Processor selects a Read Early command to be transmitted to the DCU, as indicated by block 720. Having sent this Read Early command to the DCU, path 722 is taken in the flow diagram where the DCU translates the Function code command and address, and reads the word as shown in block 702. The procedure for translation is again that shown in FIGS. 5 and 6 and the data is read from the Drum Unit to the DCU for the parity check. If the parity check is correct, the "Yes" path 706 will be taken and the data Processor will accept the data as good. However, if the parity again fails, the "No" path will be taken and again the error code will be sent to the Processor as shown by block 714. At this juncture, the Processor will check the prior command to determine whether it was Read Normal or not, and it will find that the prior command was Read Early, as established by block 720. Accordingly, the "No" path 724 will be taken where the processor will check to determine whether the prior command was a Read Early command, as shown by decision element 726. In the event the prior command was Read Early, as will be the case for this example operation, the "Yes" path 728 will be taken and the Processor will establish a Read Late command, and send it to the DCU, as indicated by block 730. The procedure will then proceed by way of line 722 for the DCU to again translate the Function code command and address and read the data as indicated by block 702. The DCU will then check parity yet a third time, and if again found to be incorrect, will proceed to transmit the error code to the processor as indicated by block 714. In this instance, when the processor checks the prior command it will find that the prior command was not a Read Normal, and the "No" path 724 will be taken. When the processor checks to find if the prior command was a Read Early command, it will find that in fact the prior command was established as Read Late, and the "No" path 732 will be taken where a fault stop of the reading of the DCU will be made, as shown by block 734. The fault stop will be necessary, in that all attempts to read the data automatically have failed. At this juncture it will be necessary for the Drum Unit to be repaired or removed from the data-processing system. It should be noted that the fault stop reading of the Drum Unit as shown by block 734, need not stop the processing but may merely advise the data-processing system that this Drum Unit cannot be read correctly and provide for processing to continue with other units. It should be pointed out that the order of occurrence of Read Early and Read Late control instructions can be reversed, and that each type of reading can be programmably selected to occur more than once if desired.

CONCLUSION

From the foregoing, it can be seen that the various detailed and general objectives have been met of providing an improved magnetic memory system wherein the time of occurrence of read-probe pulses can be programmably altered to occur a predetermined time earlier than a normal read probe pulse, or a predetermined time later than the normal read probe pulses. The addition of the translations circuitry for responding to the various function portions of the control instructions for establishing the time of occurrence of read-probe pulses has eliminated the necessity of bringing the data processing system to a stop for manually making the change selection of the time of occurrence of the read-probe pulses. It is apparent, therefore, that applicants have illustrated an embodiment that has a preferred mode of operation, but it is also understood that suitable modifications may be made in the structure, as disclosed, provided that such modifications come within the spirit and scope of the appended claims. Having, now, fully illustrated and described the invention, what is claimed to be new and desired by protected by Letters Patent is set forth in the appended claims.

We claim:

1. For use in a programmable data processing system including processing means and memory devices, programmable read-probe pulse selection circuitry for selectively controlling the times of occurrence of read-probe pulses employed to read data signals from a given one of said memory devices comprising:

receiving means for receiving programmably alterable function signal groupings from said processing means, predetermined ones of said function signal groupings indicative of the programmably selectable times of occurrence of read-probe pulses for use in the control of the readout of data signals from said given one of said memory devices function decoder means coupled to said receiving means for providing read-probe pulse selection signals in response to said predetermined ones of said function signal groupings; and gating means coupled to said function decoder means for selectively gating signals from said given one of said memory devices at predetermined times in response to said read-probe pulse selection signals.

2. Programmable read-probe pulse selection circuitry as in claim 1 wherein said receiving means includes storage register means for at least temporarily storing said programmably alterable function signal groupings, said storage register means including a plurality of bistable stages, each of said stages having true and complement output terminals for providing true and complement output signals indicative of the state of respective ones of the signals in said function signal groupings.

3. Programmable read-probe pulse selection circuitry as in claim 2 wherein said function decoder means includes first selection means coupled to a first group of predetermined ones of said stages for providing first selection signals identifying said predetermined ones of said functional signal groupings; and second selection means coupled to said first selection means and to a second group of predetermined ones of said stages for providing read-probe pulse selection signals in response to said function signal groupings.

4. Programmable read-probe pulse selection circuitry as in claim 3 wherein said gating means includes timing means coupled to said second selection means for providing programmably selected read-probe pulses for said gating of data signals at the programmably selected times in response to said read-probe pulse selection signals.

5. Programmable read-probe pulse selection circuitry as in claim 3 wherein said times of occurrence of said read-probe pulses include at least normally-timed read-probe pulses, early-timed read-probe pulses and late-timed read-probe pulses separately selectable by associated ones of said predetermined ones of said function signal groupings, and said second selection means includes early read-probe pulses selection means for providing early read-probe pulse selection signals, normal read-probe pulse selection means for providing normal read-probe pulse selection signals, and late read-probe pulse selection means for providing late read-probe pulse selection signals.

6. Programmable read-probe pulse selection circuitry as in claim 5 wherein said gating means includes first timing means coupled to said early read-probe pulse selection means for generating read-probe pulses a predetermined time earlier than normally-timed read-probe pulses in response to said early read-probe pulse selection signals, second timing means for generating said normally-timed read-probe pulses in response to said normal read-probe pulse selection signals, and third timing means for generating read-probe pulses a predetermined time later than said normally-timed read-probe pulses in response to said late read-probe pulse selection signals.

7. An improved programmably alterable memory timing system including:

programmably alterable read-probe pulse generating means;

magnetic memory means having addressable reading means for reading recorded signals from said memory means, output means for transmitting the recorded signals read from said memory means, and read-probe gating means coupled to said reading means and to said programmably alterable read-probe pulse-generating means for controlling transmission of said recorded signals read from said output means in response to pulses from said programmably alterable read-probe pulse-generating means;

control means having first input means for receiving programmably alterable function signal groupings, a predetermined one of said function signal groupings controlling said source of read-probe pulses, second input means coupled to said output means for receiving said signals read from said magnetic memory means, error-detecting means coupled to said second input means for detecting and identifying errors in said signals read from said magnetic memory means, and function decoder means coupled to said first input means for providing read-probe pulse selection signals in response to said predetermined one of said function signal groupings; and means coupling said function decoder means to said programmably alterable read probe pulse generating means such that selectively timed read-probe pulses are applied to said read-probe gating means in response to said read-probe pulse selection signals.

8. An improved programmably alterable memory timing system as in claim 7 and further including programmable data processor means coupled to said first input means in said control means for providing programmably alterable function signal groupings, and means responsively coupled to said error detecting means for programmably altering the selection of the ones of said function signal groupings to be applied to said control means for attempting to read the recorded signals correctly.

9. An improved programmably alterable memory timing system as in claim 8 wherein said input means includes storage register means for at least temporarily storing said programmably alterable function signal groupings, said storage register means including a plurality of bistable stages, each of said stages having true and complement output terminals for providing true and complement output signals indicative of the state of respective ones of the signals in said function signal groupings.

10. An improved programmably alterable memory-timing system as in claim 9 wherein said function decoder means includes first selection means coupled to a first group of predetermined ones of said stages for providing first selection signals identifying said predetermined ones of said functional signal groupings; and second selection means coupled to said first selection means and to a second group of predetermined ones of said stages for providing read-probe pulse selection signals in response to said function signal groupings.

11. An improved programmably alterable memory timing system as in claim 10 wherein said read-probe pulse generating means includes timing means coupled to said second selection means for providing programmably selected read-probe pulses for said gating of data signals at the programmably selected times in response to said read-probe pulse selection signals.

12. An improved programmably alterable memory timing system as in claim 9 wherein said times of occurrence of said read-probe pulses include at least normally-timed read-probe pulses, early-timed read-probe pulses and late-timed read-probe pulses separately selectable by associated ones of said predetermined ones of said function signal groupings, and said second selection means includes early read-probe pulses selection means for providing early read-probe pulse selection signals, normal read-probe pulse selection means for providing normal read-probe pulse selection signals, and late read-probe pulse selection means for providing late read-probe pulse selection signals.

13. An improved programmably alterable memory timing system as in claim 12 wherein said read-probe pulse generating means includes first timing means coupled to said early read-probe pulse selection means for generating read-probe pulses a predetermined time earlier than normally-timed read-probe pulses in response to said early read-probe pulse selection signals, second timing means for generating said normally-timed read-probe pulses in response to said normal read-probe pulse selection signals, and third timing means for generating read-probe pulses a predetermined time later than said normally-timed read-probe pulses in response to said late read-probe pulse selection signals.

14. An improved memory system including magnetic memory means having reading means for reading recorded signals and read-probe gating means coupled to said reading means for timing the reading of said recorded signals; and programmable control means coupled to said read-probe gating means for programmably determining the time of occurrence of read-probe pulses for enabling said read-probe gating means.

15. An improved memory system as in claim 14 wherein said read-probe gating means includes a plurality of timing circuits, each of said timing circuits establishing a predetermined time of occurrence of said read-probe pulses.

UNITED STATES PATENT OFFICE
CERTIFICATE OF CORRECTION

Patent No. 3,573,743 Dated April 6, 1971

Inventor(s) Edward P. Hadd et al.

It is certified that error appears in the above-identified patent and that said Letters Patent are hereby corrected as shown below:

Column 14, line 36, "readout" should read -- read-out --; line 43, after "gating" insert -- data --. Column 15, lines 29 and 32, "pulse-generating", each occurrence, should read -- pulse generating --; line 38, "error-detecting" should read -- error detecting --; line 46, "read probe" should read -- read-probe --. Column 16, line 8, "memory-timing" should read -- memory timing --.

Signed and sealed this 14th day of September 1971.

(SEAL)
Attest:

EDWARD M.FLETCHER,JR.
Attesting Officer

ROBERT GOTTSCHALK
Acting Commissioner of Patents